Oct. 11, 1966  G. RUNGE ETAL  3,277,848
LOADING PALLETS
Filed March 2, 1965  2 Sheets-Sheet 1
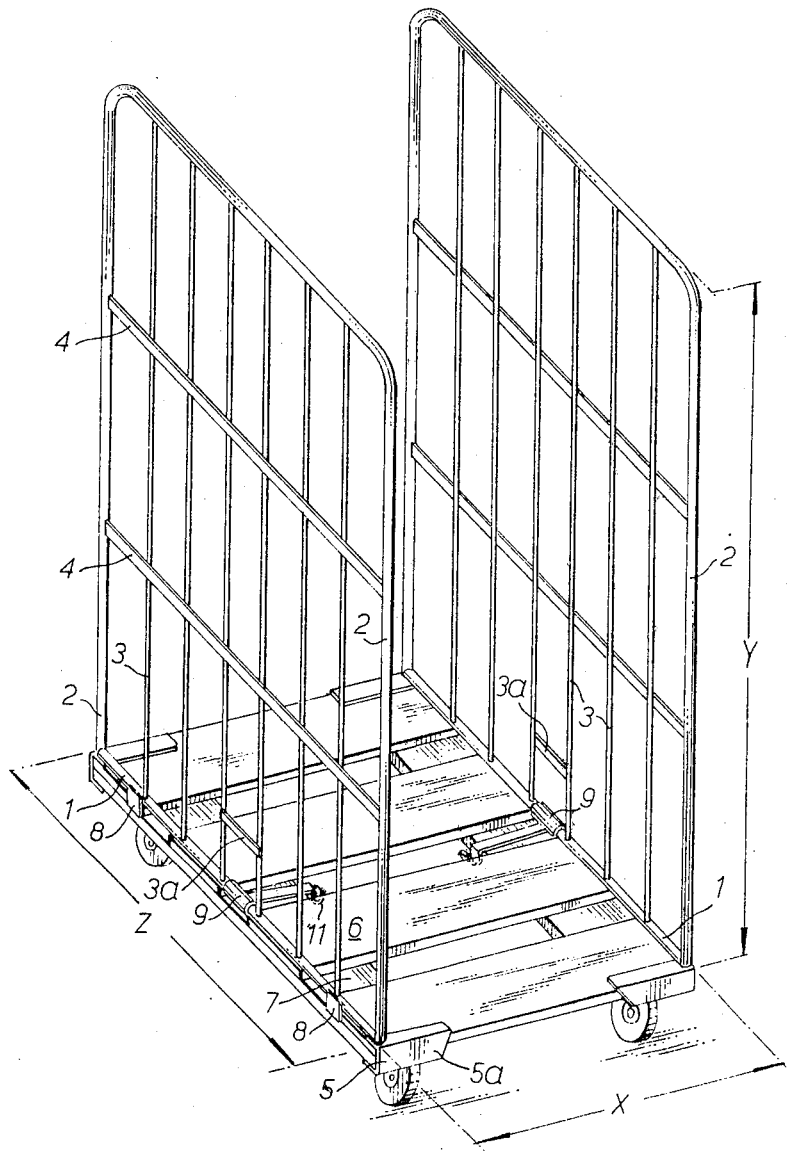
— FIG. 1. —
INVENTOR:
GERHARD RUNGE, WERNER DEGENHARDT
BY
Attorney Oct. 11, 1966    G. RUNGE ETAL    3,277,848
LOADING PALLETS
Filed March 2, 1965    2 Sheets-Sheet 2
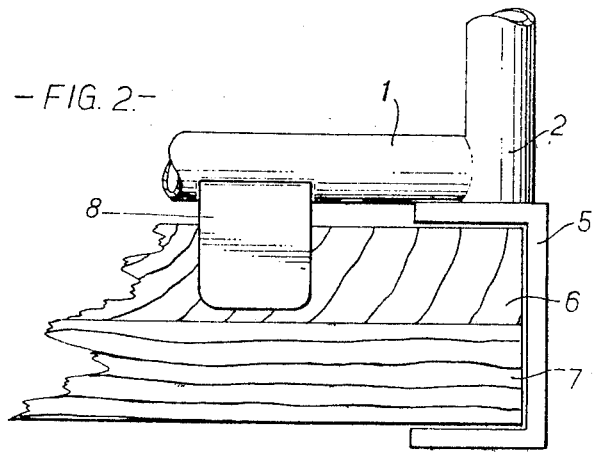
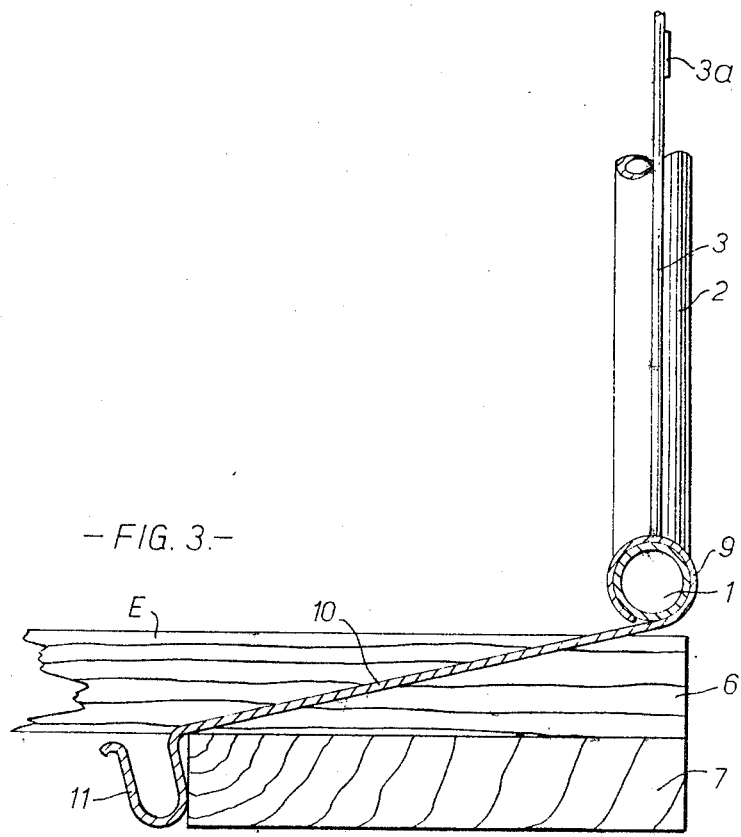
INVENTOR:
GERHARD RUNGE, WERNER DEGENHARDT
BY
Attorney 3,277,848
LOADING PALLETS
Gerhard Runge, Bremen-Lesum, and Werner Degenhardt, Bremen, Germany, assignors to Vereinigte Flugtechnische Werke Gesellschaft mit beschränkter Haftung frueher "Weser" Flugzeugbau/Focke-Wulf/Heinkel-Flugzeugbau, Bremen-Flughafen, Germany
Filed Mar. 2, 1965, Ser. No. 436,424
Claims priority, application Germany, May 6, 1964, V 25,941
6 Claims. (Cl. 108—55)

The present invention concerns removable stacking frames or stacking walls, which are mounted on the edges of loading pallets or loading stages in order to support laterally the stacked articles resting on the loading pallets.

Such stacking frames are already known in conjunction with loading pallets in various embodiments.

At the present time there is a requirement for readily detachable securing members of the stacking frames, in order to exploit the available loading surface as efficiently as possible, to be mounted directly on the the edge of the loading pallets, preferably at two opposite loading platform edges and then at these edges adapted to be simply and conveniently located and removed again. The connection may thus be angularly rigid without requiring any special connecting members between the stacking frames facing one another in their operating position.

Most known loading pallets consist of a rectangular frame body having longitudinal planks at the longitudinal edges and thereon a number of transverse planks of thick timbers. The loading pallets provided with feet or casters permit the receiving arms of a fork lift truck to be slid beneath them. Most pallets have casters which enable a pallet loaded with articles to be displaced.

In such wooden pallets provided with casters it is known to use steel tubing frames as stacking frames. Known steel tubing frames generally consist of two frame sections connected at the top which at their edge facing the pallet have retaining members which are displaceable in the plane of the pallet. One embodiment has as retaining members so-called hollow corners which engage around the corners of the pallets with their two shanks extending at right angles. Locating of the hollow corners and hence of the stacking frame is effected in such a manner that each two halves of the tubular frame are braced by means of tension members in the direction of the centre in a horizontal direction. As tension members sliding members accessible from the outside are used which slide on to sloping surfaces of the frame halves.

When using hollow corner retaining members settling of impurities is unavoidable, for example the contents spilling out of damaged packagings. When loading foodstuffs this possibility of impurities settling on the transport device is very undesirable. A further requirement is that if possible the use of often disturbing securing or tension members, between two erected stacking walls and engaging the loaded commodity between them, may be dispensed with. The stacking walls therefore should be adapted to be located adequately rigidly at the edges of the pallet, and constructed accordingly. The division of each stacking wall into two wall or frame halves resiliently interconnected only at the upper ends is considered to cause interference on unloading, because when removing the stacking walls after releasing the catch often inadmissible changes of shape of the structural parts connecting the two wall halves occur which make replacing the stacking wall difficult. The stacking wall should if possible be made of one piece and, when not in use, adapted to be stowed away without occupying much space. It should not have any retaining or connecting members liable to get lost or prone to breakdowns.

The object of the invention is to avoid the foregoing disadvantages.

According to the present invention each mountable stacking wall comprises only one rigid wall-like structural part. A division into two halves which in the plane of the pallet yield resiliently relatively to one another is not provided.

Retaining elements arranged in pairs fashioned of U-sections and rigidly connected to the stacking wall at the lower corners are used, which elements in their longitudinal direction are a sliding fit on two opposite edges of the pallet. The U-sections are open at both their ends thus preventing any contaminations from settling. They are angle rigidly connected to the lower edge of the stacking wall. When using runged tubular steel frame, the two vertical uprights of the frame are welded to the U-sections, so that the connection thereby becomes angularly rigid. The stacking wall is hence constructed to be unsupported.

To prevent the U-sections from being slid too far on to the edges of the pallet, the stacking frame on its lower longitudinal edge disposed on the outside in the operational position has flat stops projecting downwardly, which are supported from the side against the relatively wide edge of the pallet supporting the stacking frame simultaneously when subjected to pressure loads acting from the side or outside, in operational engagement with at least one hook-like catch member retaining the stacking frame in operational position, which catch engages in a recess in the base of the pallet or behind the edge of a longitudinal plank of a grate-shaped pallet. This construction has the advantage that a hook-shaped catch, which is then journalled centrally relative to the stacking frame so as to be hinged about a horizontal axis and in the locking position extends beneath the pallet plane receiving the goods to be loaded, and can be released only when the pallet has at least partly been cleared of goods stacked thereon.

The construction in known manner of the substantially rectangular stacking wall comprised of a tubular steel frame with welded in rungs is characterized by two rectilinear U-sections extending parallel to one another welded angle rigid to their corners disposed below in the operational position, which U-sections face one another with their open side and being so dimensioned and at such spaced relationship to one another that they can both simultaneously slide with a fit on the edge of the pallet in operational engagement with flat stop members welded in the proximity of the U-sections to the horizontally extending lower tubular frame so as to be projecting downwardly, which members fit snugly laterally against the relatively wide edge of the pallet and in this position are retained by means of at least one hook-shaped catch secured to be hingable about a horizontal axis to the stacking frame and engaging in the pallet.

In accordance with a further development of the invention provision is made for the hingable catch to be so arranged and constructed that in the locking position it extends beneath the pallet plane adapted to receive the loads and when not in use with the natural resilience of the material is readily secured so as to be detachable on the stacking frame in the stacking frame plane e.g. on a transverse rung, it being immaterial whether the hook-like catch or the transverse rung has resilience.

To facilitate slipping the two U-sections onto the relatively thick edge of the pallet the momentarily upper ends of the U-sections remote from the associated stacking frames are made somewhat longer than the lower, e.g. offset in bevels or stepped. It is then possible for the upper longer ends to be loosely mounted at first on the corners of the pallet, and subsequently to fit both U-sections parallel to the pallet edge and slide them until engagement of the stops. After folding over the hingable hook-like catch—the arrangement of only one centrally journalled catch on each stacking wall or each stacking frame being generally sufficient—the pallet is then ready to receive stackable commodities, i.e. the stacking wall is securely mounted.

The invention will be described further, by way of example, with reference to the accompanying drawings, in which:

FIG. 1 shows schematically a pallet composed essentially of two thick wooden planks and provided with casters having two stacking frames mounted on the longitudinal edges of the pallet for engaging the material to be loaded between them;

FIG. 2 is a fragmentary view of a structural unit on an enlarged scale partly in section and elevation; and FIG. 3 shows the arrangement and method of operation of a hook-shaped catch member hingably secured to the stacking frame.

Each stacking wall consists of a substantially rectangular frame of tubular steel having a latticework extending in the plane of the tubular steel frame. Between the two uprights 2 of the frame in the operational position extending parallel thereto are a number of rods 3. The uprights 2 are connected by means of horizontally extending transverse rods 4. The frame part 1 which in the operational position extends parallel to the edge of the pallet is rigidly connected to the two uprights 2. At the lower end of the two uprights 2 a U-section 5 extending rectilinearly or a correspondingly shaped steel plate member are so welded in position that the open sides of this U-section 5 face one another and will fit in such a way that both may be simultaneously slid in the longitudinal direction of these U-sections on to the edges on the narrow sides of the pallet. The movement of sliding on is limited by the downwardly projecting stop members 8 welded on the outside of the frame portion 1. The U-section members 7 with the uprights 2 and the lower frame portion 1 forms a rigid bracing, the U-section members 5 not projecting beyond the edge of the pallet as shown schematically in FIG. 1. The free end 5a of the U-section members 5 to facilitate mounting the frame on the edge of the pallet made of wooden planks is kept somewhat longer at the top than below. This may be obtained in the simplest way by suitably chamfering when cutting the U-sections.

The hingably mounted catch 10 is made of steel sheet. It is hingably mounted on the pipe 1 by means of a sleeve-like curling 9 and at its other end has a hook-like bend 11 which in the locking position engages through the space between two transverse planks 6, so that the catch member 10 extends beneath the pallet plane E and engaging behind the momentarily inward edge of the longitudinal plank 7. When not in use, the hook-like bend 11 is adapted to be located against a transverse member 3a of the latticework of the stacking frame with the natural resilience of the material.

The length $z$ of the supporting plate substantially in its double width corresponds to $x$.

The width of the stacking frame or the stacking wall is adapted to the length $z$. The height $y$ of the stacking wall may be optionally selected.

We claim:

1. A removable stacking wall structure for a pallet comprising a frame for extending uprightly at opposite edges of the pallet, the frame having a lower edge, two mutually parallel U-sectioned elements having mutually facing open sides secured at opposite ends of the lower edge of the frame for slidingly engaging the ends of the pallet, at least one stop member on the lower edge of the frame for engaging the edge of the pallet and at least one catch member pivotally connected transversely of the lower edge of the frame for engaging the pallet.

2. A removable stacking wall structure for a pallet comprising a frame for extending uprightly at opposite edges of the pallet, the frame having a lower edge, two mutually parallel U-sectioned elements having mutually facing open sides secured at opposite ends of the lower edge of the frame for slidingly engaging the ends of the pallet, at least one stop member on the lower edge of the frame for engaging the edge of the pallet and at least one catch member pivotally connected transversely of the lower edge of the frame for engaging the pallet, the U-sectioned elements welded to the frame and having upper parts extending substantially parallel to the lower edge of the frame and lower parts substantially perpendicular to the upper parts, the upper parts being longer than the lower parts whereby the ends of the elements are offset.

3. A removable stacking wall structure for use on pallets having two longitudinal wooden planks and transverse wooden planks secured on them in mutually spaced relationship, comprising a tubular frame having a lower horizontal tube disposed along its lower edge, two mutually parallel U-sectioned elements having mutually facing open sides secured at opposite ends of the lower edge of the frame for slidingly engaging the ends of the pallet, at least one stop member on the lower edge of the frame for engaging the edge of the pallet, a hook-shaped catch member being pivotally mounted substantially centrally of the lower horizontal tube and adapted to engage around the inside edge of a longitudinal plank of the pallet in a space between adjacent transverse planks.

4. A removable stacking wall structure for a pallet comprising a frame for extending uprightly at opposite edges of the pallet, the frame having a lower edge, two mutually parallel U-sectioned elements having mutually facing open sides secured at opposite ends of the lower edge of the frame for slidingly engaging the ends of the pallet, at least one stop member on the lower edge of the frame for engaging the edge of the pallet and at least one catch member pivotally connected transversely of the lower edge of the frame for engaging the pallet, the frame being of tubular construction having a rung substantially parallel to its lower edge and adapted to locate the catch member in the plane of the frame when the structure is not in use.

5. A removable stacking wall structure comprising a pallet having two longitudinal wooden planks and transverse wooden planks secured on them in mutually spaced relationship and a frame for extending uprightly at opposite edges of the pallet, the frame having a lower edge, two mutually parallel U-sectioned elements having mutually facing open sides secured at opposite ends of the lower edge of the frame for slidingly engaging the ends of the pallet, at least one stop member on the lower edge of the frame for engaging the edge of the pallet and at least one catch member pivotally connected transversely of the lower edge of the frame for engaging the pallet.

6. A removable stacking wall structure for a pallet comprising a tubular frame for extending uprightly at opposite edges of the pallet, the frame having a lower edge, two mutually parallel U-sectioned elements having mutually facing open sides secured at opposite ends of the lower edge of the frame for slidingly engaging the ends of the pallet, at least one stop member on the lower edge of the frame for engaging the edge of the pallet and at least one catch member pivotally connected transversely of the lower edge of the frame for engaging the pallet, a lower horizontal tube of the frame disposed along its lower edge, a hook-shaped catch member being pivotally mounted substantially centrally of the lower horizontal tube, a rung substantially parallel to the lower horizontal tube and adapted to locate the catch member in the plane of the frame when the structure is not in use and in which the U-sectioned elements are welded to the frame and have upper parts extending substantially parallel to the lower edge of the frame and lower parts substantially perpendicular to the upper parts, the upper parts being longer than the lower parts whereby the ends of the elements are offset.

References Cited by the Examiner

UNITED STATES PATENTS

| | | | |
|---|---|---|---|
| 2,471,693 | 5/1949 | Lilienfeld | 108—55 |
| 2,916,178 | 12/1959 | Arthur | 108—56 X |
| 2,932,477 | 4/1960 | Franks | 108—53 |
| 3,000,602 | 9/1961 | O'Brien | 108—53 X |
| 3,053,403 | 9/1962 | Barton | 108—53 X |
| 3,093,092 | 6/1963 | Martin et al. | 108—57 |
| 3,157,424 | 11/1964 | Hall | 108—53 X |

FOREIGN PATENTS 211,736   10/1960   Austria.

FRANK B. SHERRY, *Primary Examiner.*

G. O. FINCH, *Assistant Examiner.*